United States Patent
Rutter et al.

[15] 3,650,455
[45] Mar. 21, 1972

[54] STRIP GUIDE

[72] Inventors: Carlton G. Rutter, Seekonk; Joseph R. Maione, Norton, both of Mass.

[73] Assignee: Texas Instruments Incorporated, Dallas, Tex.

[22] Filed: July 17, 1970

[21] Appl. No.: 59,774

[52] U.S. Cl. .................... 228/6, 29/472.3, 228/4, 228/49
[51] Int. Cl. .................................................. B23k 1/00
[58] Field of Search .................. 29/471.3, 472.3; 228/4, 6, 228/6.5, 49, 17; 72/250

[56] References Cited

UNITED STATES PATENTS

| 2,978,805 | 4/1961 | Greenberger | 29/430 |
| 2,827,809 | 3/1958 | Beam | 78/97 |
| 2,722,735 | 11/1955 | Beamish | 29/472.3 X |

Primary Examiner—John F. Campbell
Assistant Examiner—Robert J. Craig
Attorney—Harold Levine, Edward J. Connors, Jr., John A. Haug, James P. McAndrews and Gerald B. Epstein

[57] ABSTRACT

A guidance system for guiding a relatively wide metal strip and one or more relatively narrow metal strips to be roll bonded as they travel to the bonding rolls for accurately laying the narrow strip or strips on the wide strip. It comprises a carriage mounted for lateral sliding movement relative to the path of the strips, the wide strip and the narrow strip or strips being guided through the carriage for travel to the bonding rolls. The carriage is movable laterally in response to lateral deviation of the wide strip from a vertical longitudinal reference plane accurately to maintain the narrow strip or strips in position relative to the wide strip. It also acts in response to variations in the width of the wide strip accurately to maintain the narrow strip or strips in position relative to a side edge of the wide strip.

8 Claims, 5 Drawing Figures

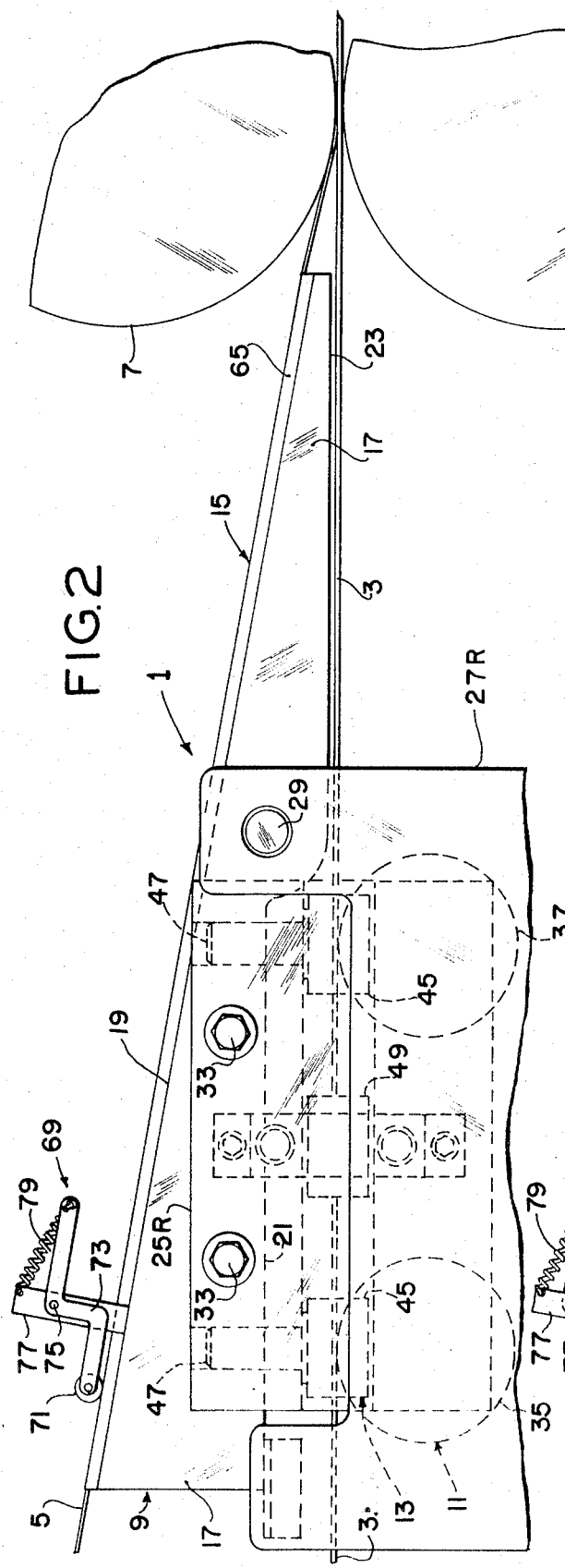
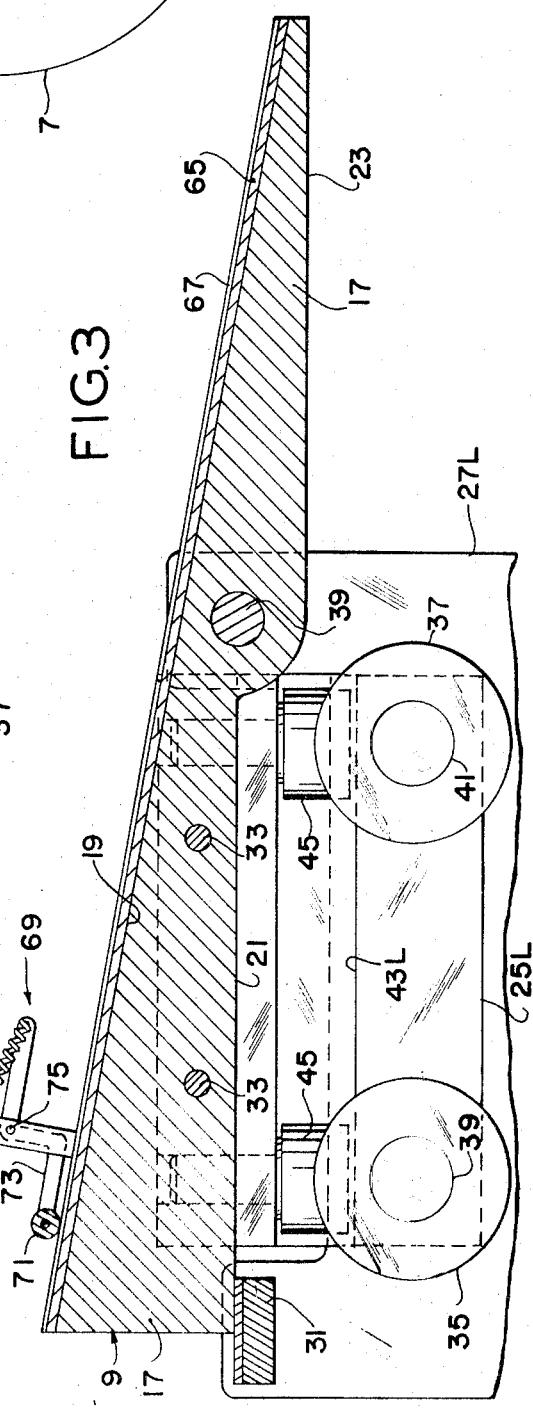

STRIP GUIDE

This invention relates to the guidance of metal strips to be roll bonded, and more particularly to apparatus for guiding a base strip and one or more strips narrower than the base strip for accurately combining the strips as they travel to the bonding rolls.

In the production of certain integrated circuit components, it is necessary to provide a composite metal strip comprising a base strip of metal (e.g., Kovar) with a so-called top lay consisting of one or more stripes of a different metal (e.g., aluminum) extending longitudinally on one face of the base strip and bonded thereto, with the stripe (or stripes) located in highly accurate position relative to the side edges of the base strip. Such a composite strip is desirably produced by roll bonding, but a considerable problem is therein presented in respect to the guidance and combining of the base strip and the strips for forming the top lay stripes as the strips travel toward the squeeze rolls for bonding them together, and particularly so in the case of bonding relatively thin and fragile stripe-forming top lay strips to the base strip.

Accordingly, among the several objects of this invention may be noted the provision of apparatus for guiding a base strip and one or more strips for forming a top lay stripe or stripes accurately to lay the latter on top of the former as the strips travel toward a set of squeeze rolls for roll bonding them; and the provision of apparatus such as described adapted to compensate for deviation of the base strip from a predetermined path and also for variations in the width of the base strip in such manner as accurately to position the top lay strip or strips on the base strip.

In general, apparatus of this invention comprises a carriage mounted for lateral sliding movement relative to the path of the strips. This carriage carries means for supporting the base strip for travel thereover to the squeeze rolls, means engageable with the opposite side edges of the base strip, and means above the path of the base strip for supporting and guiding the top lay strip (or strips) for travel in a vertical plane (or planes) between the side edges of the base strip. With this arrangement, the carriage is slidable laterally in response to lateral deviations of the base strip from a vertical longitudinal reference plane and in response to variations in the width of the base strip accurately to maintain the top lay strip (or strips) in predetermined position relative to the base strip. Other objects and features will be in part apparent and in part pointed out hereinafter.

In the accompanying drawings, in which one of various possible embodiments of the invention is illustrated, FIG. 1 is a plan view of apparatus made in accordance with this invention;

FIG. 2 is a side elevation of the apparatus;

FIG. 3 is a vertical central longitudinal section on line 3—3 of FIG. 1;

Corresponding reference characters indicate corresponding parts throughout the several views of the drawings.

Figure 1:
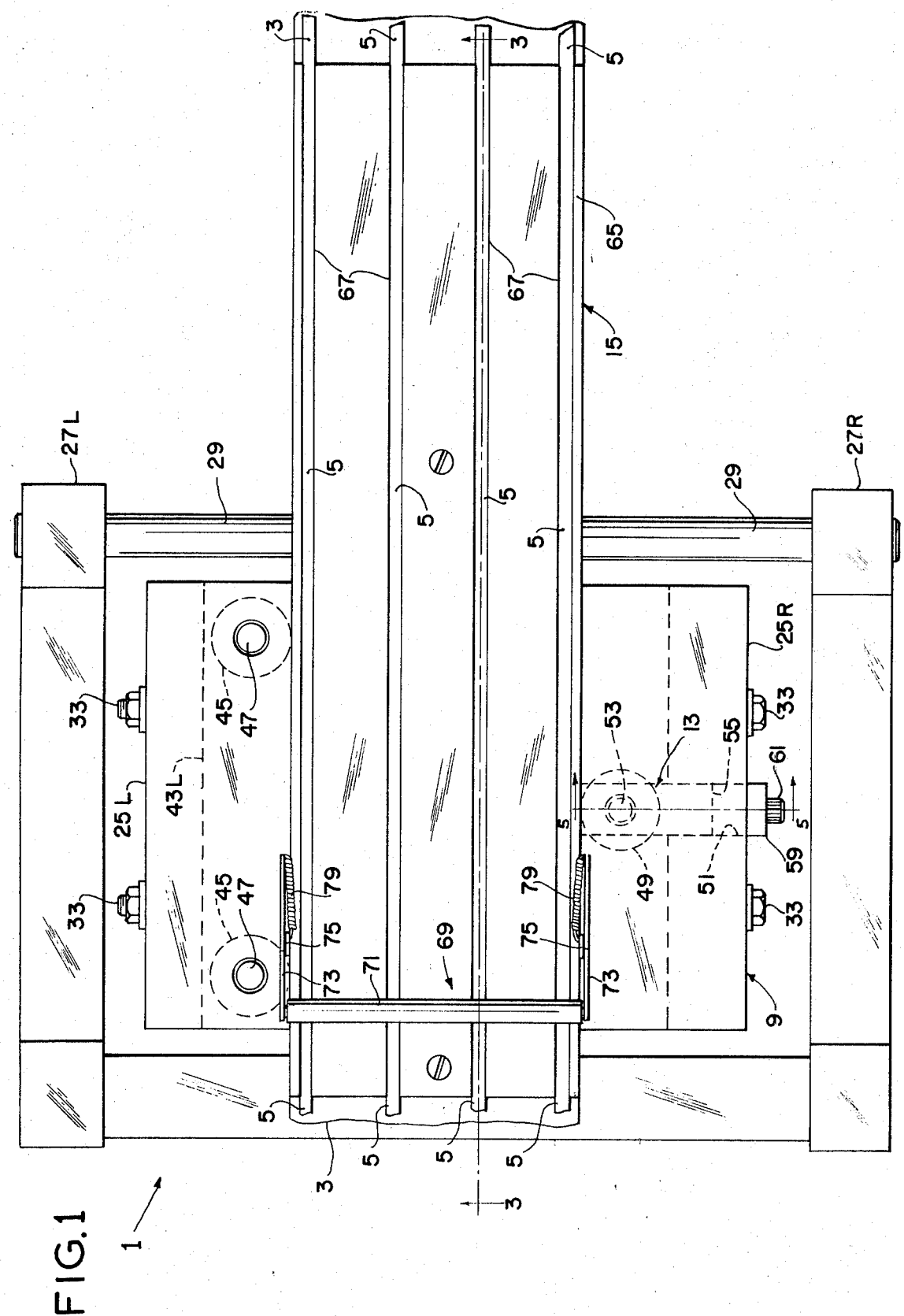
Figure 4:
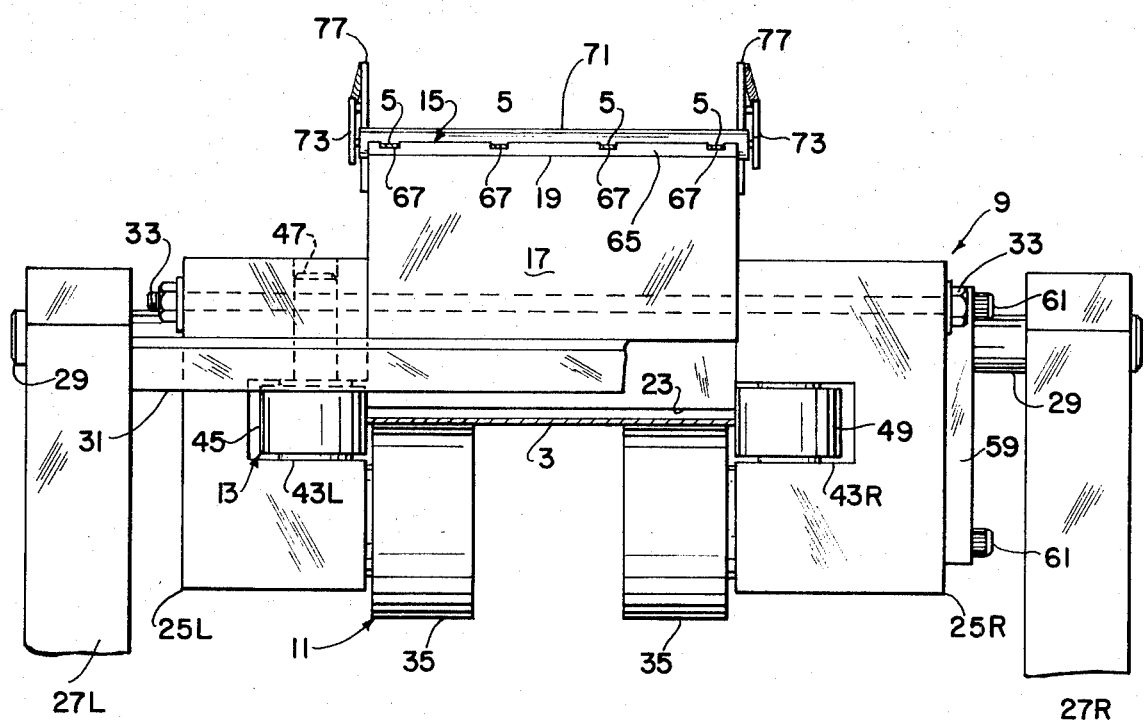
FIG. 4 is a left end view of FIG. 2 with parts broken away.

Referring to the drawings, there is generally indicated at 1 apparatus of this invention for guiding a first metal strip 3 constituting a base strip and at least one top lay strip 5 (the second strip) and bringing these strips together as they travel toward a set of squeeze rolls 7 for bonding the strips together. As shown, the apparatus 1 comprises a carriage generally designated 9 mounted for lateral sliding movement relative to the path of the strips and carrying means generally indicated at 11 for supporting the base strip 3 for travel toward the rolls 7, means generally indicated at 13 engageable with opposite side edges of the base strip, and means generally indicated at 15 above the path of the base strip 3 for supporting and guiding the second strip 5 for travel in a vertical plane between the side edges of the base strip.

More particularly, the carriage 9 comprises a main body section 17 which is rectangular in plan, having a width corresponding generally to the width of the base strip 3 which the carriage is to handle and a length somewhat over three times its width. This body section has a top surface 19 inclined downwardly from one end constituting its entrance end (its end away from the rolls 7) to its other end constituting its exit end (its end toward the rolls 7) at an angle of about 10° to the horizontal. Its bottom surface is stepped, having a relatively raised rearward horizontal bottom surface portion 21 and a relatively depressed forward horizontal surface portion 23. Secured to the left- and right-hand sides of the carriage body section 17 are left- and right-hand side blocks 25L and 25R, these blocks extending down well below the bottom of the body section (left and right hand being as viewed in the direction of travel of the strips from the entrance to the exit end of the carriage). The carriage 9 is mounted for lateral sliding movement between a pair of fixed left- and right-hand side mounting plates 27L and 27R on a rod 29 extending between the plates through a bore in the side blocks and body section of the carriage about midway of the length of the carriage, and on a bar 31 extending between the side plates underlying the entrance (rearward) end of the carriage. Bolts for securing the side blocks 25L and 25R to the sides of the carriage body section 17 are indicated at 33.

The means 11 for supporting the base strip 3 comprises a rearward pair of horizontally disposed rolls 35 and a forward pair of horizontally disposed rolls 37. Rolls 35 are mounted on horizontal shafts 39 extending inward in opposed relation from the side blocks 25L and 25R below the carriage body section 17 at the rearward end of the side blocks, and rolls 37 are mounted on horizontal shafts 41 extending inward in opposed relation from the side blocks below the carriage body section at the forward end of the side blocks. Rolls 35 and 37 are of the same diameter and have their axes in the same horizontal plane so as to provide a horizontal bottom rolling support means for the base strip 3 to travel thereover to the squeeze rolls 7.

Figure 5:
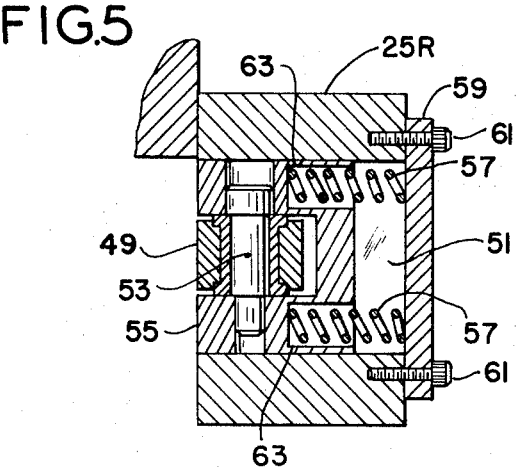
FIG. 5 is a vertical section on line 5—5 of FIG. 1.

Each of the side blocks 25L and 25R is formed to be of C-shape in transverse cross section, thus having a horizontal groove 43L, 43R extending lengthwise thereof, with this groove opening toward the inside of the block. The means 13 engageable with the opposite side edges of the base strip 3 comprises a pair of vertically disposed side rolls each designated 45 mounted in the groove 43L of the left-hand side block 25L on vertical shafts 47, and a single spring-biased vertically disposed side roll 49 mounted in the groove 43R of the right-hand side block 25R. The left-hand side rolls 45 are spaced longitudinally of the carriage 9, being located at the forward and rearward ends of the block 25L in the same vertical transverse planes as the bottom rolls 35 and 37. The right-hand side block 25R has a transverse opening 51 (see FIG. 5) centrally of its length. The roll 49 is mounted on a vertical shaft 53 in a C-shaped yoke 55 which is slidable laterally with respect to block 25R in the opening 51. The yoke is spring-biased inward by a pair of compression springs 57 reacting from a plate 59 secured on the outside of block 25R as indicated at 61 against the inner ends of spring sockets 63 in the yoke.

A guide plate 65 for the top lay strips 5 (four of these being shown by way of illustration) is secured on the inclined top surface of the carriage body section 17, this guide plate having a plurality of guide grooves 67 for the top lay strips 5 extending lengthwise of the plate in its top surface. Means may be provided such as indicated at 69 for holding down the strips 5 in the grooves 67. As shown, this means comprises a holddown roller 71 extending crosswise of the guide plate carried at its ends by arms 73 pivoted at 75 on posts 77 extending up above plate 65 at opposite sides thereof, the roller 71 being biased to swing down against the top surface of plate 65 by springs such as indicated at 79.

The base strip 3 travels horizontally through the guide apparatus 1 to the rolls 7 over the horizontal rolls 35 and 37, which support it underneath the carriage body section 17. Rolls 45 and 49 engage the opposite side edges of the base strip 3. Rolls 45 are fixed relative to the carriage 9 and constitute a datum for the edge of the base strip 3 (its left edge) which engages these rolls. Roll 49, being spring-biased laterally inward, exerts a lateral force on the base strip 3 to hold its datum (left) edge against the datum rolls 45. The top lay strips 5 travel through the guide grooves 67 in the inclined carriage top plate 65 and are laid on top of the base strip 3 as the latter exits from under the carriage body section 17 and as the strips 5 exit from the grooves 67 at the exit end (the squeeze roll end) of the carriage 9. The strips 3 and 5, so combined, then pass between the rolls 7 and are squeezed together and bonded.

If the base strip 3 deviates laterally in one direction or the other from a predetermined vertical longitudinal reference plane (e.g., the central vertical longitudinal plane which bisects the set of rolls 7), the carriage 9 slides laterally in response thereto and carries the top guide plate 65 for the top lay strips 5 along with it, thus accurately maintaining the position of the top lay strips 5 relative to the side edges of the base strip 3. If the width of the base strip 3 should vary from one place to another along its length, the spring-loaded edge guide roll 49 compensates therefor to maintain accurate positioning of the top lay strips relative to the datum edge (the left-hand edge) of the base strip by moving relative to the carriage 9 while the datum rolls 45 remain fixed in position relative to the carriage. Thus, the base strip itself is utilized accurately to control the positioning of the top lay strip or strips relative to the base strip. The top plate 65 may be readily changed to accommodate guiding of one or more top lay strips to different positions on a base strip. It is possible that the apparatus may be used to produce composite strip with a pattern effect of the top lay strip or strips, e.g., a zigzag or crisscross effect, by positive lateral shifting of the base strip.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for guiding a first metal strip and a second metal strip narrower than the first to lay the second strip on top of the first in accurately located position thereon while the strips are travelling in the direction of their length to a set of squeeze rolls for bonding the strips together, said apparatus comprising a carriage mounted for lateral sliding movement relative to the path of the strips, means carried by the carriage for supporting the first strip for travel thereover toward said rolls, means carried by the carriage engageable with the opposite side edges of the first strip, and means on the carriage above the path of the first strip for supporting and guiding the second strip for travel in a vertical plane between the side edges of the first strip, said carriage being slidable laterally in response to lateral deviation of the first strip from a vertical longitudinal reference plane to move the carriage laterally so as to maintain the second strip in accurately located position with respect to the first strip.

2. Apparatus as set forth in claim 1 wherein said means engageable with the opposite side edges of the first strip comprises means at one side of the carriage mounted in fixed position on the carriage and means at the opposite side of the carriage movable laterally relative to the carriage and biased in the direction toward the respective side edge of the first strip.

3. Apparatus as set forth in claim 2 wherein said means at one side of the carriage comprises a pair of side rolls rotatable on vertical axes spaced longitudinally of the carriage and said means at the opposite side of the carriage comprises a single side roll rotatable on a vertical axis between the transverse planes of the vertical axes of said pair of rolls, and having means mounting said single side roll for movement laterally of the carriage, and spring means biasing said roll mounting means to move in the direction toward the respective side edge of the first strip.

4. Apparatus as set forth in claim 3 wherein the means for supporting the first strip comprises rolls carried by the carriage below the body of the carriage rotatable on horizontal axes transverse to the carriage.

5. Apparatus as set forth in claim 4 wherein the carriage has a top plate thereon having at least one guide groove extending longitudinally thereof in its top surface for guiding a said second strip, said top plate being inclined downward from the end of the carriage away from the squeeze rolls to the end of the carriage toward the squeeze rolls.

6. Apparatus as set forth in claim 5 wherein said top plate is removable from the carriage for replacement thereof with another top plate.

7. Apparatus as set forth in claim 5 wherein the carriage has side blocks extending downwardly therefrom at opposite sides thereof, said blocks carrying said strip supporting rolls and said side rolls.

8. Apparatus as set forth in claim 7 wherein the carriage is slidable on fixed supports extending transversely with respect to the strips.

* * * * *